United States Patent [19]

Iwakura et al.

[11] Patent Number: 5,100,704
[45] Date of Patent: Mar. 31, 1992

[54] METHOD FOR MAKING A COMPOSITE OF VULCANIZED RUBBER AND A URETHANE ELASTOMER

[75] Inventors: Mitsuharu Iwakura, Kamakura; Kouji Nishibe, Fujisawa; Akira Tani, Hadano, all of Japan

[73] Assignee: The Yokohama Rubber Co., Ltd., Tokyo, Japan

[21] Appl. No.: 649,915

[22] Filed: Jan. 25, 1991

[30] Foreign Application Priority Data

Nov. 14, 1989 [JP] Japan ................... 1-296430

[51] Int. Cl.$^5$ .............................. B05D 3/04
[52] U.S. Cl. .................... 427/302; 427/207.1; 427/322; 427/393.5; 427/412.1; 428/423.1; 428/424.8; 428/424.7
[58] Field of Search ............ 156/331.2, 326; 427/393.5, 208.8, 208.2, 207.1, 302, 322, 412.1, 407.1; 428/423.1, 424.8, 424.7

[56] References Cited

U.S. PATENT DOCUMENTS

| | | | |
|---|---|---|---|
| 3,484,274 | 12/1969 | McCarthy | 427/208.2 |
| 3,965,051 | 6/1976 | Markusch et al. | 521/100 |
| 3,991,255 | 11/1976 | Blaskiewicz et al. | 428/424.8 |
| 4,435,456 | 3/1984 | Hausch | 428/36 |
| 4,748,212 | 5/1988 | Murachi et al. | 525/359.2 |
| 4,804,584 | 2/1989 | Nakashima et al. | 428/424.2 |
| 4,839,218 | 6/1989 | Sugino | 427/412.5 |
| 4,849,468 | 7/1989 | Murachi et al. | 524/523 |
| 5,045,393 | 9/1989 | Kumanoya et al. | 427/302 |

FOREIGN PATENT DOCUMENTS

51-31839  9/1976  Japan.
60-31217  7/1985  Japan.

*Primary Examiner*—Michael Lusignan
*Assistant Examiner*—Diana L. Dudash
*Attorney, Agent, or Firm*—Finnegan, Henderson, Farabow, Garrett & Dunner

[57] ABSTRACT

A method for bonding together rubber vulcanizates and urethane elastomers to form a composite comprising treating an outer surface of the rubber vulcanizate with a first solution of an organic compound containing a

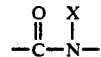

linkage dissolved in a solvent where X is a halogen, then coating the treated surface with a second solution of a diphenylmethane diisocyanate-based compound dissolved in a solvent and thereafter casting a urethane elastomer over the coated surface and curing the composite.

8 Claims, No Drawings

METHOD FOR MAKING A COMPOSITE OF VULCANIZED RUBBER AND A URETHANE ELASTOMER

BACKGROUND OF THE INVENTION

1. Field of the Invention

This invention is directed generally to composite rubber materials in which a rubber vulcanizate and a thermosetting urethane elastomer are bonded or otherwise laminated together into an integral structure. More particularly, the invention relates to a method for such bonding.

2. Description of the Prior Art

Rubber products resulting from vulcanization of naturally occurring or synthetic rubbers find wide application in tires, belts, hoses, rolls and the like. Such products are available with various physical qualities which, however, are dependent upon the class of rubbers and when type of additives. It has been found that the vulcanized rubbers are combined with urethane elastomers into adhesively composite form, they can be diverse with respect to their physical characteristics. However, those vulcanizates do not firmly adhere to different materials.

To cope with the above problem of reduced adhesion, several methods have been proposed. One such method involves the oxidative treatment of a rubber vulcanizate on an outer side with a strong oxidant such as concentrated sulfuric acid, potassium permanganese or potassium bichromate, followed by washing of the oxidant with water and by subsequent flexing of the vulcanizate so as to cause fine or minute cracks over the treated surface. Another method uses isocyanate iodide for surface treatment of a similar vulcanizate as disclosed for instance in Japanese Patent Publication (JP-B) 51-31839. As a still further method JP-B 60-31217 teaches treating a surface of a vulcanized rubber with an organic type halogen compound having in the molecule a

linkage where X represents a halogen atom and also with a dioxime compound.

The first-mentioned method has the drawback that the use of a strong oxidant requires meticulous care and oftentimes deteriorates the vulcanizate at or under the treated surface, inviting insufficient adhesion to the mating material. The second-mentioned method is undesirable for commercial application because the isocyanate iodide compound is of a special class requiring careful handling. The last-mentioned method lacks sufficient working life after surface treatment, entailing poor bondability.

SUMMARY OF THE INVENTION

With the above drawbacks of the prior art in mind, the present invention seeks to provide an improved method for firmly bonding rubber vulcanizates to urethane elastomers without resorting to special chemicals and without involving objectionable deterioration. Composite rubber materials according to the invention have good adhesive strength and are suitable for dynamic use.

Many other features and advantages of the invention will become apparent from a reading of the following description.

More specifically, the invention provides a method for bonding a vulcanized rubber and a urethane elastomer into an integral structure, which comprises treating a vulcanizate of a base rubber on an outer surface thereof with a first solution, the first solution resulting from dissolving in a solvent an organic type halogen compound having in the molecule a

linkage where X represents a halogen, coating a second solution onto the vulcanizate over the treated surface, the second solution having dissolved in a solvent a diphenylmethane diisocyanate-based compound in an amount of from 5 to 20% by weight in terms of active isocyanate, and thereafter casting a urethane elastomer precursor over the coated surface of the vulcanizate and subjecting the same to curing.

DETAILED DESCRIPTION OF THE INVENTION

Vulcanizates used as substrates for purposes of the present invention are made up of rubber compositions having the rubber molecule three-dimensionally cross-linked. Suitable rubber compositions include those resulting primarily, and most typically and importantly, from sulfur-curing and further from thiuram-, peroxide-, quinoid-, resin-, metallic salt-, metallic oxide-, polyamine-, radiation- and hexamethylenetetramine-curing and the like.

Base rubbers used herein may be chosen from natural rubber (NR) and synthetic rubbers.

Included in synthetic rubbers are polyisoprene rubber (IR) derived by homopolymerizing a conjugated diene such as isoprene, butadiene, chloroprene or the like, polybutadiene rubber (BR), polychloroprene rubber, styrene-butadiene rubber (SBR) obtained by copolymerizing a vinyl compound such as styrene, acrylonitrile, vinyl pyridine, acrylic acid, methacrylic acid, alkyl acrylate, alkyl methacrylate or the like with the above conjugated diene, vinyl pyridine-butadiene-styrene rubber, acrylonitrile-butadiene rubber, acrylic acid-butadiene rubber, methacrylic acid-butadiene rubber, methyl acrylate-butadiene rubber, methyl methacrylate-butadiene rubber, olefin-diene copolymeric rubber of ethylene, propylene, isobutylene or the like with a diene, such as isobutylene-isoprene rubber (IIR), olefin-unconjugated diene copolymeric rubber such as ethylene-propylene-cyclopentadiene rubber, ethylene-propylene-5-ethylidene-2-norbornene rubber or ethylene-propylene-1,4-hexadiene rubber, polyalkenomer rubber made available from ring opening polymerization of a cycloolefin, such as polypentenomer rubber, and oxirane ring opening-polymerized rubber such as sulfur-curable epichlorohydrin rubber or polypropylene oxide rubber. Also included are halogenated rubbers such as chlorinated isobutylene-isoprene rubber (Cl-IIR), brominated isobutylene-isoprene rubber (Br-IIR) and the like.

The rubbers listed above may be used singly, or two or more of the rubbers may be blended where desired.

Curing agents either alone or in combination may be used from among those employed in the foregoing modes of curing.

Various other additives may be incorporated, and they include fillers such as carbon black, silica, calcium carbonate and the like, softeners such as mineral oil, vegetable oil, synthetic plasticizer and the like, antioxidants, vulcanizing accelerators and the like.

The vulcanizate according to the invention may be obtained by kneading one or more given rubbers, a selected curing agent or agents and suitable additives and subsequently by curing the resultant admixture such as for example by lead wrap curing, direct steam curing, mold press curing, indirect curing or the like.

An important feature of the method according to the invention, is that it is possible to noticeably enhance the adhesion capabilities primarily of NR, BR, IR, IIR, CI-IIR, Br-IIR and EPDM. These rubbers among other eligible rubbers are known to be less adhesive to corresponding substrates or urethane elastomers.

The method of the invention essentially comprises treating an outer surface of a vulcanizate with solution (I) and thereafter applying solution (II) onto the vulcanizate over its treated surface.

Solution (I) contains an active halogen compound of an organic type dissolved in a solvent, which halogen compound has in the molecule a

linkage where X represents halogen.

Specific examples of active halogen compounds include halogenated succinimides such as N-bromsuccinimide and the like, halogenates of isocyanuric acid such as trichloroisocyanuric acid, dichloroisocyanuric acid, and halogenated hydantoins such as dichloromethyl hydantoin and the like either alone or in combination. Isocyanurate halogenates are particularly preferred.

The active halogen compound according to the invention presumably reacts with the vulcanized rubber at the unsaturated double bond in a manner shown below.

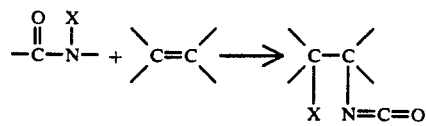

where X is halogen.

Solvents for use in solution (I) may be those in common use but that are inert to the active halogen compound. Typical examples include aromatic hydrocarbons such as benzene, toluene and the like, ethers such as diethyl ether, dioxane, tetrahydrofuran and the like, ketones such as methyl ethyl ketone, cyclohexanone and the like, chlorinated hydrocarbons such as ethane chloride, chloroform, carbon tetrachloride and the like, tertiary alcohols such as t-butyl alcohol and the like, and mixtures thereof.

The concentration of the active halogen compound in solution (I) may be set, though not restricted, from 0.5 to 5% by weight with a view toward easing dissolution and the efficiency of treatment. Below 0.5% would bear no appreciable effect, whereas above 5% would develop unreactive deposits on the vulcanizate surface.

Solution (II) is by nature adhesive and has a diphenylmethane diisocyanate-based compound dissolved in a solvent, which compound should range in an amount of from 5 to 20% by weight in terms of active isocyanate. This amount is counted from the net weight of active isocyanate contained in that compound. More specifically, if it is assumed that such a compound has in molecular weight 30% by weight of an active isocyanate portion and that solution (II) contains 50% by weight of that compound, then the content of the isocyanate portion in solution (II) would be 15% by weight.

Diphenylmethane diisocyanate-based compounds according to the invention denote compounds having a diphenylmethane diisocyanate in the molecule. They include for example diphenylmethane diisocyanate, carbodiimide-modified diphenylmethane diisocyanate and polymeric diphenylmethane diisocyanate, of which the latter two compounds are particularly preferred. Carbodiimide-modified diphenylmethane diisocyanate is held in equilibrated relation as represented by the following formula, a specific example of which is made commercially available as Isonate 143L (MD Chemicals Co.).

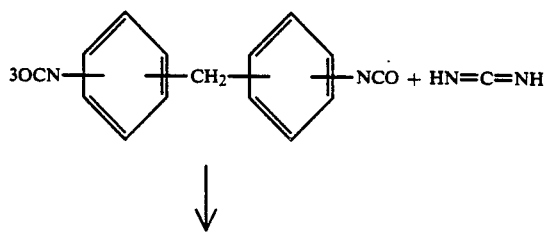

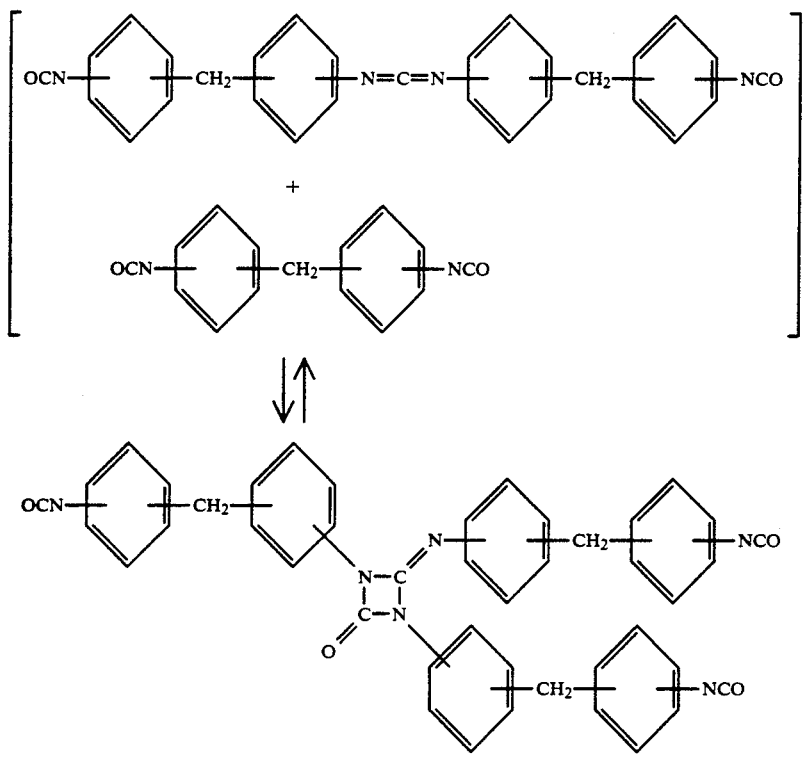

Polymeric diphenylmethane diisocyanate has the formula

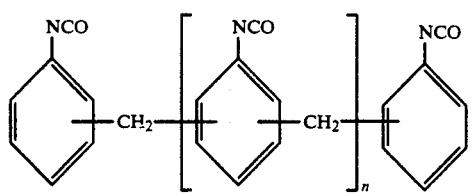

where n is 0 or an integer of 1 or greater. Specific examples include PAPI-135 and PAPI-20 (MD Chemicals Co.), 40V-10 (Sumitomo-Bayer Urethane Co.), Millionate MR (Nippon Polyurethane Co.) and MDI-CR (Mitsui Toatsu Chemicals Co.). Millionate MR contains mostly compounds where n in the formula is 0, 1 and 2 but also small amounts where compounds of n is above 3.

The two compounds of the above formulae preferably have an average number active isocyanate moieties of not smaller than 2.3.

According to the method of the invention, the diphenylmethane diisocyanate-based compound in solution (II) reacts with the

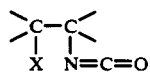

linkage where X is a halogen, the linkage resulting from the reaction of solution (I) with the vulcanizate, or with active groups existing on the rubber surface and also with a companion urethane elastomer so that the compound forms a network structure, contributing greatly to adhesive force. For network formation, the average number of active isocyanate moieties in such compound should exceed 2.3.

The concentration of the diphenylmethane diisocyanate-based compound in solution (II) should not depart from the above specified range. Less than 5% by weight would not be effective to improve adhesion. More than 20% by weight would make the resulting solution less wettable on the vulcanizate, insufficient in working life and susceptible to objectionable foaming.

As solvents for use in solution (II) any ordinary solvents are suitable but should be inert to the diphenylmethane diisocyanate-based compound. Solvents similar to those in solution (I) can be conveniently used.

It has that been found further advantages can be achieved by incorporating in solution (II), as another component, a specified amount of a selected liquid diene polymer having hydroxyl groups. This component improves affinity and hence wettability of solution (II) for the vulcanizate.

Suitable liquid diene polymers include liquid polyisoprene, liquid polybutadiene, liquid 1,2-polybutadiene, liquid styrene-butadiene rubber, liquid acrylonitrile-butadiene rubber and the like, all of which have a plurality of hydroxyl groups chemically attached to the molecule at the terminal end. These polymers may be straight or branched.

The average molecular weight of the liquid diene polymer may be in the range of about 500 to 5,000, and the number of hydroxyl groups may preferably be about 2 or 3 per molecule of the polymer. Molecular weights if smaller than 500 would make it difficult to yield a polymer and if larger than 5,000 would render the resulting polymer too viscous to be easily dissolved in a solvent.

The liquid diene polymer should be added in an amount of 2 to 20% by weight. Below 2% would fail to give improved affinity of solution (II) for the vulcanizate. Above 20% would lead to reduced adhesion strength.

Urethane elastomers useful in the invention are of a thermosetting type which are obtainable by chain-extending and curing prepolymers, reaction products of either one or both of polyester polyol and polyether polyol with polyisocyanate.

Thermosetting urethane elastomers prior to curing are generally available as either one of the following precursors, all of which are suitable for use in the invention.

1. Typical stable precursor derived by the reaction of a liquid prepolymer having an active isocyanate moiety at the terminal end with diamine or diol, followed by chain extension and by subsequent curing.

2. An unstable precursor obtained by forming an instable intermediate product from polyester and polyisocyanate and then by casting and curing the product in the presence of a crosslinking agent.

3. Precursor resulting from weighing, mixing and injecting polyester and polyisocyanate into a mold, thereby directly reacting the admixture without prepolymer formation.

To implement the method of the invention, a given vulcanizate is treated on an outer surface with solution (I) and thereafter coated with solution (II). The vulcanizate thus treated and coated is placed in a mold into which is then cast an uncured urethane elastomer precursor, whereupon curing is effected.

Treating with solution (II) may be performed by dipping the vulcanizate in solution (I) or by coating or spraying solution (I) onto that substrate. Coating or spraying is particularly preferred.

Time lengths of contact of the vulcanizate with solution (I) vary with the class of base rubbers, the kind of organic type halogen compounds, the kind of solvents and the concentration of solutions. In either mode of treatment 5 minutes at most are sufficient. The solvent in solution (I) on completion of the treatment is allowed to volatilize at room temperature.

Coating with solution (II) may be done, subsequent to solvent volatilization from solution (I), by brushing, rolling, spraying or the like as is commonly known in the art. The solvent is likewise removed from solution (II) at room temperature.

The vulcanizate after being surface-treated with solutions (I) and (II) is put into a mold and the urethane elastomer precursor then cast. Curing produces a composite rubber material. In this instance heat curing may be employed in known manner.

The vulcanizate treated according to the invention is fully workable even when left for one day or so.

The vulcanizate may be preferably pretreated by degreasing with a solvent, or by buffing or roughing with a sounding paper, a grinder, a whetstone or a sounder so that a fresh surface layer is exposed for treatment with solutions (I) and (II).

EXAMPLES

The following examples are given to further illustrate the present invention.

In these examples a sheet-like vulcanizate is used to facilitate performance evaluation. It is to be noted however that the vulcanizate may be formed in a plate-like, rod-like, ball-like, fiber-like or any other suitable shape.

A rubber composition shown in Table 1 was press-cured at 145° C. and at 50 kg/cm$^2$ for 30 minutes into a sheet-like vulcanizate of 2 mm$\times$150 mm$\times$150 mm. Buffing with a sounder and subsequent degreasing with toluene were done to provide a test substrate. Surface treatment was carried out under the conditions indicated below.

As test solution (I) an ethyl acetate solution was prepared in which was contained 2% by weight of chlorinated isocyanuric acid. The substrate was surface-treated by brush coating of the solution. After volatilization of the solvent another similar coating was repeated.

The substrate was thereafter brush-coated on the treated surface with different types of test solution (II). Coating was repeated twice with the solvent volatilized. A diphenylmethane diisocyanate-based compound in ethyl acetate was used in Inventive Examples 1 to 6, a diphenylmethane diisocyanate-based compound and a liquid diene polymer in ethyl acetate in Inventive Examples 7 to 10 and a polyisocyanate compound in methylene chloride in Comparative Example 2. After coating of solution (II) the samples in Inventive Examples 1 to 10 were left for 4 hours and the sample in Comparative Example 2 for 2 hours. Comparative Example 1 was a control devoid of surface coating with solution (II).

The substrate thus surface-treated was placed in a mold into which a urethane elastomer precursor was then cast to a thickness of 2 mm. Curing was accomplished at 100° C. for 16 hours in a hot-air oven. The resulting composite material was cut into a 25 mm-wide, 150 mm-long, strip-like specimens.

Peel strength was examined by the JIS K-6301 procedure, and foaming was visually inspected at the peeled surface. The results are shown in Table 3 in which the letter "F" refers to "laminary fractured" and "S" "interfacially separated" and the symbol "o" to "not foamed" and "x" to "foamed".

As appears clear from the tabulated results, solution (II) representing the invention exhibits prolonged working life after surface treatment, which contributes to the fabricability of the material. The composite materials in Inventive Examples 1 to 6 excel in peel strength without foaming and find dynamic application. This is particularly true where a liquid diene polymer is present in the solution (II) as is evident from Inventive Examples 7 to 10.

Omission of solution (II), Comparative Example 1, showed a sharp decline in peel strength. A polyisocyanate compound as a component in solution (II), which was outside the scope of the invention, Comparative Example 2 was insufficient in working life, hence less fabricatable with time, and also susceptible to foaming.

TABLE 1

| component | weight part |
| --- | --- |
| Nipol 1500 | 100.0 |
| zinc oxide | 5.0 |
| stearic acid | 1.0 |
| HAF Carbon | 50.0 |
| Diana Process Oil AH-20 | 10.0 |
| Hitanol 2181 | 2.0 |
| Nocrac AW-Y | 1.0 |
| Antigen 3C | 0.5 |
| Soccinol CZ | 1.5 |
| sulfur | 2.0 |

TABLE 2

| component | weight part |
| --- | --- |
| Hyprene L-100 | 100 |
| Ihara Curemine MT | 12 |

TABLE 3

| Runs | Inventive Examples | | | | | |
| --- | --- | --- | --- | --- | --- | --- |
| | 1 | 2 | 3 | 4 | 5 | 6 |
| solution (II) | | | | | | |
| type of polyisocyanate (A) | PAPI-135 | PAPI-135 | PAPI-135 | PAPI-20 | 44V-10 | Isonate 143L |
| average number of isocyanate moiety | 2.7 | 2.7 | 2.7 | above 3 | 2.7 | 2.3 |
| amount of active isocyanate, % | 6.26 | 9.39 | 15.65 | 9.15 | 9.30 | 8.70 |
| type of liquid diene polymer (B) | — | — | — | — | — | — |
| (B)/(A)/solvent | 0/20/80 | 0/30/70 | 0/50/50 | 0/30/70 | 0/30/70 | 0/30/70 |
| working life after surface treatment, hr | 16 | 8 | 8 | 8 | 8 | 8 |
| peel test | | | | | | |
| peel strength, kgf/25 mm | 25.6 | 20.2 | 30.5 | 17.4 | 16.1 | 14.7 |
| appearance | F | F | F | F | F | F |
| forming | o | o | o | o | o | o |

| Runs | Examples | | | | Comparative Examples | |
| --- | --- | --- | --- | --- | --- | --- |
| | 7 | 8 | 9 | 10 | 1 | 2 |
| solution (II) | | | | | | |
| type of polyisocyanate (A) | PAPI-135 | PAPI-135 | PAPI-20 | Isonate 143L | | Desmodule R |
| average number of isocyanate moiety | 2.7 | 2.7 | above 3 | 2.3 | | 3 |
| amount of active isocyanate, % | 6.67 | 7.70 | 10.03 | 7.57 | | 7.00 |
| type of liquid diene polymer (B) | BR | BR | IR | BR | | — |
| (B)/(A)/solvent | 5.6/21.3/73.1 | 2.8/24.6/72.6 | 5.6/32.9/61.5 | 11.1/26.1/62.8 | | 0/20/80 |
| working life after surface treatment, hr | 8 | 8 | 8 | 8 | 24 | 2 |
| peel test | | | | | | |
| peel strength, kgf/25 mm | 41.2 | 44.5 | 40.0 | 37.8 | 4.0 | 9.2 |
| appearance | F | F | F | F | S | S |
| forming | o | o | o | o | o | x |

Notes to Tables 1 to 3

| | |
| --- | --- |
| Nipol 1500 | rubber, SBR<br>Nippon Zeon Co. |
| HAF Carbon | filler, carbon black<br>Asahi Carbon Co. |
| Diana Process Oil AH-20 | softener, process oil<br>Idemitsu Kosen Co. |
| Hitanol 2181 | tackifier, phenol-formaldehyde resin<br>Hitachi Chemicals Co. |
| Nocrac AW-Y | antioxidant, 6-ethoxy-2,2,4-trimethyl-1,2-dihydroquinone<br>Ohuchi Shinko Chemicals Co. |
| Antigen 3C | antioxidant, N-phenyl-N'-isopropyl-p-phenylene diamine<br>Sumitomo Chemicals Co. |
| Hyprene L-100 | prepolymer, urethane polymer with an isocyanate moiety at the terminal end<br>Mitsui Toatsu Co. |
| Ihara Cureamine MT | curative, 4,4'-methylene-bis(2-chloroaniline) |

TABLE 3-continued

| | |
|---|---|
| | Ihara Chemicals Co. |
| PAPI-135 | diphenylmethane diisocyanate-based compound, mixture of diphenylmethane diisocyanate with polymeric diphenylmethane diisocyanate (isocyanate moiety: 2.7) |
| | MD Chemicals Co. |
| PAPI-20 | diphenylmethane diisocyanate-based compound, mixture similar to PAPI-135 but with an isocyanate moiety of above 3 |
| | MD Chemicals Co. |
| 44V-10 | diphenylmethane diisocyanate-based compound, mixture of diphenylmethane diisocyanate with polymeric diphenylmethane diisocyanate (isocyanate moiety: 2.7) |
| | Sumitomo-Bayer Urethane Co. |
| Isonate 143L | diphyenylmethane diisocyanate-based compound, mixture of diphenylmethane diisocyanate with carboimide-modified diphenylmethane diisocyanate (isocyanate moiety: 2.3) |
| | MD Chemicals Co. |
| Desmodule R | polyisocyanate compound, 20% of triphenylmethane triisocyanate in methylene chloride |
| BD | liquid butadiene polymer, R45 HT, hydroxyl group: 2.3/molecule, molecular weight: 2,800 |
| | Idemitsu Petrochemicals Co. |
| IR | liquid polyisoprene polymer, hyroxyl group: 2.3/molecule, molecular weight: 2,500 |
| | Idemitsu Petrochemicals Co. |

What is claimed is:

1. A method for bonding a vulcanized rubber to a urethane elastomer to form a composite, comprising:
    (a) treating a vulcanizate of a base rubber on an outer surface thereof with a first solution of an organic compound containing a

linkage dissolved in a solvent, where X is a halogen;
    (b) coating a second solution onto the treated surface of the vulcanizate comprising a carbodiimide-modified diphenylmethane diisocyanate dissolved in a solvent, said diisocyanate being present in an amount of from 5 to 20% weight based on the active isocyanate and having an average number of active isocyanate moieties of at least 2.3, and from 2 to 20% by weight of a liquid diene polymer having an average molecular weight of from 500 to 5000 and 2 to 3 hydroxyl groups per molecule, said polymer being selected from the group consisting of liquid polyisoprene, liquid polybutadiene, liquid styrene-butadiene rubber and liquid acrylonitrile-butadiene rubber; and
    (c) thereafter casting a urethane elastomer precursor over the coated surface of the vulcanizate to form a composite and subjecting the composite to curing.

2. The method of claim 1, wherein the base rubber is selected from the group consisting of natural rubber, butadiene rubber, polyisoprene rubber, isobutylene-isoprene rubber, chlorinated isobutylene-isoprene rubber, brominated isobutylene-isoprene rubber and ethylene-propylene-diene rubber or blends thereof.

3. The method of claim 1, wherein said organic compound is a halogenated isocyanuric acid and is present in said first solution in an amount of from 0.5 to 5% by weight.

4. A composite rubber material comprising a vulcanized rubber and a cured urethane elastomer bonded thereto to form an integral structure made by the method of claim 1.

5. A method for bonding a vulcanized rubber to a urethane elastomer to form a composite, comprising
    (a) treating a vulcanizate of a base rubber on an outer surface thereof with a first solution of an organic compound containing a

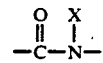

linkage dissolved in a solvent, where X is a halogen;
    (b) coating a second solution on the treated surface of the vulcanizate comprising a polymeric diphenylmethane diisocyanate dissolved in a solvent, said diisocyanate being present in an amount of from 5 to 20% by weight in terms of active isocyanate and having an average number of active isocyanate moieties of at least 2.3, and from 2 to 20% by weight of a liquid diene polymer having an average molecular weight of from 500 to 5000 and 2 to 3 hydroxl groups per molecule, said polymer being selected from the group consisting of liquid polyisoprene, liquid polybutadiene, liquid styrene-butadiene rubber and liquid acrylonitrile-butadiene rubber; and
    (c) thereafter casting a urethane elastomer precursor over the coated surface of the vulcanizate to form a composite and subjecting the composite to curing.

6. The method of claim 5, wherein the base rubber is selected from the group consisting of natural rubber, butadiene rubber, polyisoprene rubber, isobutylene-isoprene rubber, chlorinated isobutylene-isoprene rubber, brominated isobutylene-isoprene rubber and ethylene-propylene-diene rubber or blends thereof.

7. The method of claim 5, wherein said organic compound is a halogenated isocyanuric acid and is present in said first solution in an amount of from 0.5 to 5% by weight.

8. A composite rubber material comprising a vulcanized rubber and a cured urethane elastomer bonded thereto to form an integral structure made by the method of claim 5.

* * * * *